March 23, 1954 T. W. BERGQUIST 2,672,882
SAFETY VALVE
Filed Sept. 30, 1949
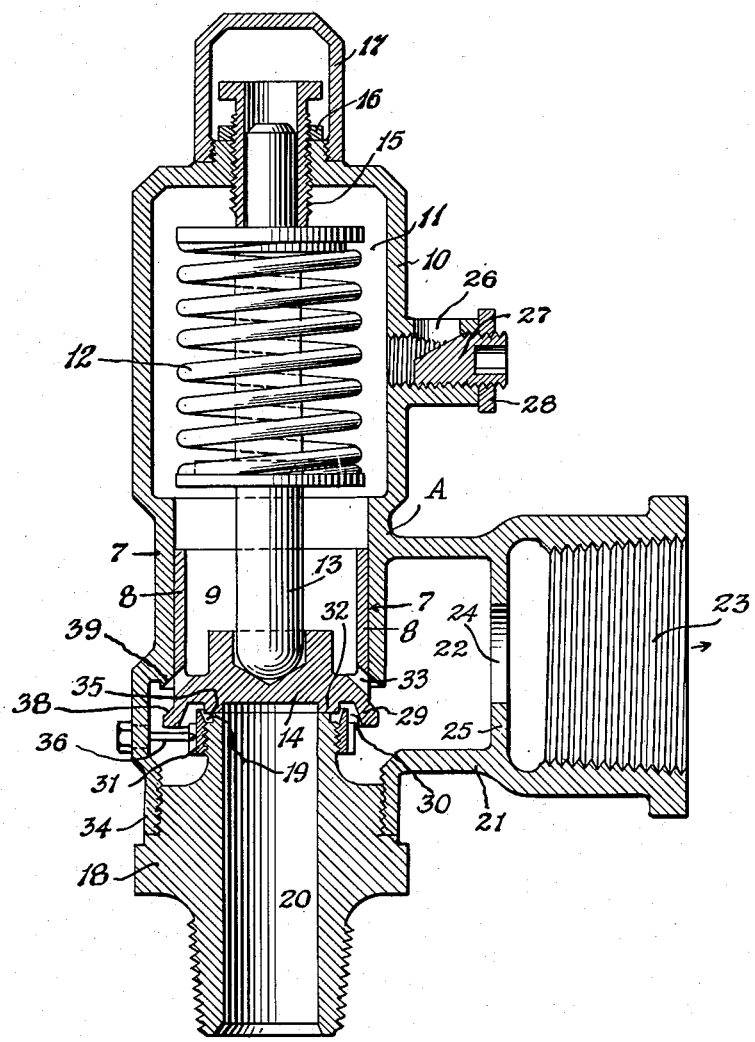
INVENTOR
Theodore W. Bergquist
BY
ATTORNEYS Patented Mar. 23, 1954

2,672,882

UNITED STATES PATENT OFFICE 2,672,882

SAFETY VALVE

Theodore W. Bergquist, Willow Grove, Pa.

Application September 30, 1949, Serial No. 118,883

7 Claims. (Cl. 137—478)

1

This invention relates to safety valves.

One of the primary objects of the invention is to provide a simple and effective valve which, among other things, has high lift, shorter blowdown, and great stability and freedom from chattering, and which is so constructed as to prevent substantialy expansion of the vapors or gases being handled in the valve, until emergence from the outlet of the valve, whereby the valve may be made of relatively small size in relation to its capacity, and whereby, especially in the case of very high pressures, sub-cooling and freezing are avoided.

For any given inlet size and pressure it is apparent that a safety valve will emit maximum rate of flow when it has a full or straight inlet bore providing the lift ratio is sufficient to develop an annular orifice area equivalent to the bore area. Prevailing codes require that advertised rate of flow (or its counterpart, effective orifice area) be attained at over pressure not exceeding 103% of the pressure at which the valve is set to open, and further require the valve to operate free from chatter and to reclose when the system pressure falls to 96% of the set pressure of the valve. In specific applications, however, it is desirable that full orifice area be developed at accumulations less than 3% and that reclosure take place at blow down as low as 1%. The smaller the pressure differential between the full open and full closed positions, the greater is the tendency toward valve instability. Conventional valves depend on either a straight bore design having a modified (less than full) lift or on a Venturi throat with full lift for maintaining stability of operation. In either instance, the effective orifice area restricts the inlet area and rate of flow is reduced. Many attempts have been made to enlarge the ratio between the annular orifice or throat area and the inlet area so as to increase the rate of flow, but when the ratio exceeds 60% difficulty arises in maintaining stable operation. In the valve, herein described, the annular orifice or throat area has been enlarged to substantially 100% of the inlet area without inducing unstable performance. As the gas or vapor emits from the annular orifice into the body of the valve, conventional designs permit generous expansion to take place, thereby requiring large size bodies and outlets. Through the features embodied in my design such expansion need not take place until the gas or vapor has emerged from the outlet of the body and as a consequence the valve may be of relatively small size. Furthermore, in my construction, high relative capacity, inherent stability and small compact size make possible its use in applications similar to those on board ship where space limitations may prohibit the use of conventional designs. In addition, many modern processes involving the use of conventional safety valves handling gas or vapor under extremely high pressures and low temperatures experience sub-cooling of the medium as it expands into the relatively large body of the valve after emitting from the annular orifice. Sub-cooling tends to freeze the working parts of the valve in an open position, thus impairing the effectiveness of the valve as a safety device. By avoiding expansion within the valve proper my invention effectively avoids or minimizes sub-cooling and the consequent freezing of the working parts.

How the foregoing, together with such other objects and advantages as may hereinafter appear or are incident to the invention, are realized is illustrated in the accompanying drawing which is a vertical section through a valve embodying my improvements.

Referring now to the drawing, the reference character A indicates the valve body. This valve body has a cylindrical portion 7 adapted to receive the hollow piston 8 of a piston valve 9. Above the cylindrical portion 7, the valve body extends upwardly at 10, desirably of somewhat larger diameter than that of the cylindrical portion 7, to provide a pressure chamber 11 adapted to receive the loading spring 12 which, with its spindle 13, is adapted normally to hold the valve disk 14 against its annular seat 19. The pressure of the spring 12 is adjusted by means of the screw 15 which is threaded in the top of the portion 10 of the valve body and is locked by the lock nut 16. Cap 17 covers the screw and nut.

A base 18 is threaded into the lower open end portion 34 of the valve body and is provided with the annular seat 19 for the disk 14 of the valve. The base 18 preferably has a straight bore, constituting the inlet to the valve body.

The valve body also has a lateral portion 21 providing a pressure chamber 22, which communicates with the outlet 23 of the valve body, through the orifice 24 provided by the internal flange 25 of the lateral, and which also communicates with the inlet when the valve is open.

The chamber 11 is normally vented to the atmosphere through the bleed vent 26, the size of which is preferably controlled by an adjustable bleed vent valve 27, normally held in adjusted position by means of the lock nut 28.

The valve disk 14 is provided with an annular seat portion 32, preferably of greater width than the seat portion 19, and it also has an annular flange 29 the inner wall of which flares downwardly and outwardly. This flange has an internal diameter substantially greater than the external diameter of the seat 32, and the flange extends downwardly to a plane below that of the seat 32 to provide a secondary pressure chamber 30. On the upper end of the base 18 there is threaded a warn ring 31 which extends upwardly into the chamber 30, preferably to a short distance above the lower face of the annular seat 32 of the valve disk 14, forming the huddling chamber 35. The inner diameter of the free end of the ring 39 is preferably larger than the external diameter of the valve seat 32. The ring 31 is locked in adjusted position by the ring pin 36. The piston valve is provided with a plurality of ports 33 which establish communication between the chamber 22 and the chamber 11 through the hollow piston 8. The flange 29 has an external circumferential seat 38 which, in the full lift position, cooperates with companion seat 39 on the end of cylindrical portion 7 to effectively seal off the escape of gas or vapor from chamber 22 into chamber 11. The parts are so proportioned that the developed annular orifice or throat area formed by seats 32 and 19 when the valve 14 is in full lift, is substantially equal to that of the inlet as well as that of orifice 24.

When the valve is used as a relief valve, the operation is as follows: When the pressure in inlet bore 29 is sufficient to overcome the pressure for which the spring 12 is set, the valve is lifted, and, by virtue of the huddling chamber 35 and the jet action and the greater area presented, pops to high lift position, and the ports 33 are covered by the cylinder 7. Because of the orifice 24, a back pressure builds in the chamber 22 and the pressures in chambers 20 and 22 quickly become substantially isobaric. Pressure in chamber 22 increases the lifting force on the valve and upon the addition of overpressure forces seat 38 against its companion seat 39 effectively breaking communication of the gas or vapor between chamber 22 and chamber 11 and thereby avoiding leakage which would normally occur between the working parts. Back pressure in chamber 11 is quickly dissipated through vent 26, the entire underside of the piston 8 has its area exposed to a high pressure existing in chamber 22, and the valve is stabilized in a full open position. As the inlet pressure is relieved the spring force causes piston 8 to recede slightly breaking the seal between seating surfaces 38 and 39, and the back pressure builds up in chamber 11 due to leakage past the parts 7 and 8 because of the working clearance therebetween. The amount of pressure that builds up is regulated by the adjustable vent 26. When the total force due to the pressure in the inlet 20 and in the chamber 22 is reduced to a point where it is exceeded by the combined spring load and back pressure on the top of the valve 14, the valve moves downwardly and the ports 33 crack open, permitting the higher pressure which exists in chamber 22 to enter chamber 11 above the valve. Due to the relatively small area of the vent 26, the back pressure on top of the valve increasingly adds to the spring load, which results in a sudden return of the valve to its annular seat 19, effectively stopping further flow without chattering. After the valve has seated, the pressure in chambers 11 and 22 is dissipated through vent 26 as well as outlet 23, thereby returning the loading of the valve to the spring only.

The size of orifice 24 being substantially the same as the size of the bore 20, it will be seen that relatively little expansion of the gas or vapors will take place within the valve and that great expansion can only take place after the gases or vapors have passed beyond orifice 24. This has two advantages. In the first place, it makes it possible to use, for a given capacity, a much smaller valve than would otherwise be the case. It also effectively minimizes sub-cooling of the gas or vapor within the valve and thus avoids the freezing which would occur therein, especially at high pressures, if the gas or vapor were permitted to expand very substantially. By avoiding sub-cooling, the danger of the freezing of the valve in open position is eliminated.

Conventional designs depend almost entirely on an exactness of spring stiffness or rating to control four major requirements of valve operation, namely, pop point, lift, blow down and stability. The spring, therefore, plays a highly important and sensitive part in the proper consistent functioning of such valves and for that reason prevailing codes have been motivated in placing a close tolerance on the working range of the spring, holding that range to $\pm 10\%$ for any pressure under 250 p. s. i. and $\pm 5\%$ for pressures in excess of 250 p. s. i. A great number of springs must necessarily be used to meet these conditions. However, in the design herein proposed it will be seen that by regulation of the vent 26, the back pressure in the chamber 11 can be so adjusted as to force the valve to close at a pressure only slightly less than the opening pressure. It can be seen further that because the regulation of the bleed vent 26 results in a corresponding change in the pressure in the chamber 11, the force of this pressure so created can be used to supplement the load of the spring and to compensate for any deficiency that may lie in the spring loading, thereby making my design less dependent on critical spring tolerance. This makes it possible to use a given spring for a larger range of pressures than would otherwise be the case.

It will be seen that the construction is very simple and easy to manufacture. Moreover, assemblage is facilitated. In this connection the internal diameter of the portion 10, the cylinder 7, and the threaded end portion 34 of the valve body, are such that the spring and its spindle and the piston valve may all be inserted through the open end 34, after which the base 18 may be screwed home.

It will also be observed that the bleed vent valve 27 affords a simple arrangement for controlling the back pressure built up by reason of the orifice 24.

While I have shown the orifice 24 as fixed and the vent as adjustable, this may be reversed and the bleed vent made constant or fixed and the orifice adjustable, as by means of providing an adjustable butterfly valve in place of the fixed orifice 24.

Because of the inherent stability of the valve, as previously pointed out, it is possible to use a full or straight inlet bore and sustain a lift of 25% of the inlet diameter without incurring chattering or instability, despite the fact that a straight bore presents greater frictional resistance than does a Venturi bore.

By my invention, a valve of relatively very small size may be used in place of the customary relatively large sized valve for the same capacity.

While the invention has been described in connection with a straight inlet bore and full lift, it is to be understood that it is not to be limited thereto inasmuch as a modified bore and lift may be employed so long as the developed annular orifice area and the area of orifice 24 are substantially equal.

I claim:

1. In a safety valve, a valve body having an inlet and a pressure chamber adapted to communicate therewith, a spring loaded piston valve for controlling communication between said inlet and said pressure chamber, said body having a second pressure chamber beyond the valve and said valve being ported to provide communication between said pressure chambers when said valve is in closed position, said valve body also having a cylindrical part adapted to receive and guide said valve and to cover the porting of the valve only when the valve is in full open position, said first pressure chamber having a discharge orifice having an area of the general order of that of the area at the minimum cross-section of the inlet whereby when the valve is open the pressures in the inlet and in said first pressure chamber tend to become isobaric, and said second pressure chamber having a vent of substantially smaller size than that of said discharge orifice.

2. In a safety valve, a valve body having an inlet and a pressure chamber adapted to communicate therewith, a spring loaded piston valve for controlling communication between said inlet and said pressure chamber, said body having a second pressure chamber beyond the valve and said valve being ported to provide communication between said pressure chambers when said valve is in closed position, said valve body also having a cylindrical part adapted to receive and guide said valve and to cover the porting of the valve only when the valve is in full open position, said first pressure chamber having a discharge orifice having an area of the general order of that of the area at the minimum cross-section of the inlet whereby when the valve is open the pressures in the inlet and in said first pressure chamber tend to become isobaric, and said second pressure chamber having a vent of substantially smaller size than that of said discharge orifice, and means for adjusting the size of said vent.

3. In a safety valve, a valve body having an inlet and a pressure chamber adapted to communicate therewith, a spring loaded piston valve for controlling communication between said inlet and said pressure chamber, said body having a second pressure chamber beyond the valve and said valve being ported to provide communication between said pressure chambers when said valve is in closed position, said valve body also having a cylindrical part adapted to receive and guide said valve and to cover the porting of the valve only when the valve is in full open position, said first pressure chamber having a discharge orifice having an area of the general order of that of the area at the minimum cross-section of the inlet whereby when the valve is open the pressures in the inlet and in said first pressure chamber tend to become isobaric, and said second pressure chamber having a vent of substantially smaller size than that of said discharge orifice, said inlet having an annular seat for the valve and said valve having an annular seat portion of larger diameter than said inlet seat and being itself of larger diameter than its seat, and a ring surrounding said inlet seat and having an internal diameter of larger diameter than that of said inlet seat, whereby to provide a huddle chamber.

4. The safety valve of claim 1 in which the inlet has a straight bore.

5. The safety valve of claim 1 in which the inlet has a straight bore and in which the developed annular orifice area, when the valve is in full lift, is substantially the same as the area of the inlet at minimum cross-section.

6. The safety valve of claim 1 in which the cylindrical part and the piston valve have cooperating seats adapted to engage when the valve is in full lift.

7. The safety valve of claim 3 in which the cylindrical part and the piston valve have cooperating seats adapted to engage when the valve is in full lift.

THEODORE W. BERGQUIST.

References Cited in the file of this patent

UNITED STATES PATENTS

| Number | Name | Date |
|---|---|---|
| 935,709 | Turner | Oct. 5, 1909 |
| 2,035,129 | Hopkins | Mar. 24, 1936 |
| 2,261,461 | Falls | Nov. 4, 1941 |
| 2,501,730 | McClure | Mar. 28, 1950 |